United States Patent Office 3,131,153
Patented Apr. 28, 1964

3,131,153
FOAM PRODUCING COMPOSITIONS
Kenneth Klausner, Belleville, N.J., assignor to Allied Chemical Corporation, New York, N.Y., a corporation of New York
No Drawing. Filed Oct. 25, 1961, Ser. No. 147,445
6 Claims. (Cl. 252—305)

The present invention relates to the production of self-propelling homogeneous liquid compositions which, when dispensed in a suitable aerosol container, produce foams of limited stability. This application is a continuation-in-part of my copending application Serial No. 35,408, filed June 13, 1960.

Numerous self-propelling liquid compositions are available commercially. These compositions, when dispensed, produce either stable foams or atomized sprays. The compositions producing stable foams are useful, for example, as shaving or shampoo lathers. The compositions producing atomized sprays find utility as after-shave lotions, cold-wave lotions, nail polish removers, etc. Although extensively used, the latter compositions, because of the relatively uncontrolled dispension of atomized sprays may cause physical or property damage. Moreover, these compositions are marketed in the form of emulsions which require shaking before dispensing.

It is the object of the present invention to provide self-propelling homogeneous liquid compositions which, when dispensed in a suitable aerosol container, provide foams of limited stability.

In accordance with the above object, I have developed self-propelling homogeneous liquid compositions which, when dispensed in an aerosol container provided with a foam-dispensing head, form foams of limited stability. These compositions comprise (1) a member of the group consisting of saturated aliphatic monohydric alcohols containing 1 to 3 carbon atoms and dialkyl ketones in which the alkyl groups contain 1 to 3 carbon atoms, (2) a member of the group consisting of glycerol, monoalkylene glycols in which the alkylene group contains 2 to 4 carbon atoms and polyalkylene glycols in which the alkylene groups contain 2 to 4 carbon atoms, (3) a surface active agent, and (4) a propellant, in the following highly critical proportions.

| Ingredient: | Weight percent |
|---|---|
| Alcohol or dialkyl ketone | 26 to 64 |
| Glycerol or alkylene glycol | 28 to 64 |
| Surface active agent | 0.5 to 5 |
| Propellant | 2 to 30 |

By a foam of limited stability, I mean a foam which does not become completely liquefied when exposed to the atmosphere for at least about 15 minutes, preferably at least about an hour, but when disturbed, as by application of heat or by rubbing, reverts quickly, i.e. within about two seconds, to a liquid.

As indicated above, commercially available compositions producing atomized sprays may be injurious as a result of the uncontrolled dispension of the sprays. Thus, upon application of a cold-wave composition to the head, the spray may get in the eyes of the user. Further, when a composition for removing nail polish is employed, the spray may settle on near-by furniture and remove the finish. Numerous other known compositions, when dispensed as atomized sprays, may cause similar detrimental effects.

The self-propelling liquid compositions of this invention enable the user to quickly and completely dispense a desired amount to a restricted area in a way impossible with conventional aerosol sprays. For example, when used as a cold-wave lotion, the dispensed foam can be applied directly to the head. Upon application of a comb or brush, the foam quickly reverts to a liquid and is spread over the desired area with ease. When used as a nail polish remover, a small amount of the dispensed foam is placed on each fingernail. When the foam is rubbed with a cleansing tissue, it becomes a liquid and removes the polish. Similar success may be attained by application as foams of such diversified products as pre-electric shave lotions, after-shave lotions, astringents, colognes, hair-coloring tints, hair dressings, skin refresheners, sun tan lotions, toilet water preparations, shoe polishes, furniture polishes, acne preparations, dandruff preparations, paint removers, etc.

A further advantage of the compositions of the present invention is that they are clear, homogeneous liquids. As a result, unlike commercially available products, the compositions require no shaking before dispensing and, moreover, may be attractively packaged in transparent containers.

Still further, the compositions, when dispensed in the form of foams of limited stability, possess the advantage over commercially available products of avoiding premature evaporation of volatile components.

Any saturated aliphatic monohydric alcohol containing 1 to 3 carbon atoms or dialkyl ketone in which the alkyl groups contain 1 to 3 carbon atoms may be used in the compositions of this invention. Among the suitable alcohols are ethyl alcohol, n-propyl alcohol, isopropyl alcohol, etc. The dialkyl ketones include acetone, methyl ethyl ketone, etc.

Glycerol or any monoalkylene glycol or polyalkylene glycol in which the alkylene groups contain 2 to 4 carbon atoms may be used in the compositions of this invention. Among the suitable alkylene glycol compounds are ethylene glycol, diethylene glycol, triethylene glycol, tetraethylene glycol, propylene glycol, 1,3-butylene glycol, polyethylene glycols, such as polyethylene glycol 200, 400, 600, etc.

It should be understood that, if desired, mixtures of the alcohols and/or dialkyl ketones and of the glycerol and/or alkylene glycols may be employed in the compositions of this invention.

Use of decreasing amounts of alcohol or dialkyl ketone and increasing amounts of glycerol or alkylene glycol within the aforementioned ranges favors the formation of more stable foams. If, however, amounts of alcohol or dialkyl ketone and glycerol or alkylene glycol outside the indicated critical ranges are employed, emulsified instead of homogeneous compositions are obtained.

The surface active agent, which must be soluble in either the alcohol or dialkyl ketone or in the glycerol or alkylene glycol but not in both, may be anionic, non-ionic or cationic in character. Non-ionic surface active agents, and particularly surface active agents formed by reaction of fatty alcohols and ethylene oxide (polyoxyethylated fatty alcohols), such as polyoxyethylene stearates, are preferred.

Other non-ionic surface active agents include alkyl phenoxy polyoxyethylene ethanols, such as nonyl phenoxy polyoxyethylene ethanol, and glyceryl esters, such as glyceryl monostearate, diglycol laurate and diglycol oleate. Suitable anionic surface active agents include sulfated fatty alcohols, such as sulfated cetyl alcohol and stearyl alcohol, and sulfated fatty acids, such as sulfated stearic acid, palmitic acid, oleic acid and coconut oil fatty acids. Quaternary ammonium salts are typical of suitable cationic surfactants.

Any volatile organic material which exists as a gas at room temperature, exists mainly as a liquid at room temperature and elevated pressure, is soluble in either the alcohol or dialkyl ketone or in the glycerol or alkylene glycol and has a maximum solubility of 15% by weight in the other solvent may be used as propellant. Saturated aliphatic hydrocarbons and halogenated (e.g. fluorinated) saturated aliphatic hydrocarbons having vapor pressures within the range of about 5 to 300 p.s.i.g., preferably about 10 to 85 p.s.i.g. at 70° F. are typical of the propellants which may be used in this invention. The chlorofluorinated saturated aliphatic hydrocarbons, such as dichlorodifluoromethane, monochlorodifluoromethane, dichlorotetrafluoroethane, trichlorotrifluoroethane, difluoroethane, difluoromonochloroethane, and mixtures thereof, have been found to be particularly suitable propellants. Of course, the propellant must meet the solubility tests defined above in any particular solvent system. Thus, since a propellant such as dichloromonofluoromethane has a solubility exceeding 15% by weight in propylene glycol or polyethylene glycols, it cannot be employed with solvent systems comprising an alcohol or dialkyl ketone and such glycols.

The amount of propellant employed varies within the range given above with the density of the propellant. Thus, the propellant should be added in such amount as to constitute about 2.3 to 44.4%, and preferably about 3.3 to 24.5%, by volume of the liquid composition. This requirement is met, for example, by use of chlorofluorinated saturated aliphatic hydrocarbons in amount ranging from 3 to 30% by weight of the composition. In the case of saturated aliphatic hydrocarbons of lower density, such as propane, isobutane, n-butane, isopentane and n-pentane, an amount ranging from 2 to 12.3% by weight of the composition should be used.

Depending on the nature of the product desired, the compositions may contain various additives which are soluble therein, including perfumes, medicinal substances, lubricants, resins, waxes, aldehydes, petroleum hydrocarbons, ethers, menthol, camphor, etc.

In order to obtain the desired foam of limited stability, it is necessary that the composition be dispensed in an aerosol container provided with a foam-dispensing head. A typical foam-dispensing head comprises a spout fixture adapted to be permanently mounted and rigidly supported upon the aerosol container in cooperative relation with the stem of a dispensing valve which controls the flow of material from such container. The spout fixture includes a spout through which the material may be delivered and also a valve-operating plunger mounted on a diaphragm and normally maintained in a position to insure closing of the dispensing valve. Associated with the spout fixture is an activator mounted for sliding movement from a retracted position to an advanced position or vice versa. It is so constituted that when slid into advanced position, it may be engaged by the plunger of the spout fixture to actuate the valve stem and dispense the pressurized material through the spout in the form of foam. If desired, a dip tube may be provided for delivering the composition from the inside of the container to the dispensing valve. This type of foam-dispensing head is described in greater detail in U.S. Patent 2,678,147 of May 11, 1954. Other types of foam-dispensing heads are available and may also be used in practice of this invention.

When the compositions of this invention are confined in an aerosol container, such as that described above, an internal pressure in the range of about 10 to 85 p.s.i.g. at 70° F. is generally created. In the case of glass and other frangible containers, such pressure should be kept in the range of about 10 to 30 p.s.i.g. at 70° F.

If a metallic aerosol container is used, the corrosive effect of any water which may adventitiously be present in the composition may be minimized by addition of a small proportion of a suitable corrosion inhibitor, for example, about 0.01 to 5.0% by weight of the composition. Typical inhibitors include oleic acid, N-fatty beta-amino-propionate, N-fatty beta-iminodipropionate, hexynol, morpholine, formaldehyde, etc.

In operation, the composition is introduced into the aerosol container and confined therein at the vapor pressure of the propellant. When the valve of the container is opened, the pressure on the composition is released as it emerges from the container, producing a foam of limited stability.

The following examples illustrate the preparation of typical clear, homogeneous liquid compositions coming within the scope of the present invention. These compositions, when dispensed in an aerosol container provided with a foam-dispensing head, produce foams of limited stability. In the examples, all percentages are by weight.

EXAMPLE 1

Sun Tan Lotion

| Composition: | Weight percent |
| --- | --- |
| Propylene glycol monolaurate | 2.5 |
| Anhydrous ethyl alcohol | 30.0 |
| Glyceryl p-aminobenzoate | 2.0 |
| Perfume | 0.5 |
| Propylene glycol | 65.0 |

All of the ingredients, except the propylene glycol, were admixed with agitation at room temperature. The propylene glycol was then added with constant agitation to form a liquid concentrate. The final composition was prepared by admixing 90 weight percent of this concentrate and 10 weight percent of dichlorodifluoromethane (30%)–dichlorotetrafluoroethane (70%) propellant. The composition was charged into an aerosol container provided with a foam-dispensing head. The pressure exhibited by the composition in the container was 30 p.s.i.g. at 70° F. When dispensed, the composition produced a foam of limited stability.

EXAMPLE 2

Pre-Electric Shave Lotion

| Composition: | Weight percent |
| --- | --- |
| Propylene glycol monolaurate | 4.0 |
| Anhydrous ethyl alcohol | 63.5 |
| Polyethylene glycol | 32.0 |
| Perfume | 0.5 |

All of the ingredients were mixed with agitation at room temperature to form a liquid concentrate. The final composition was prepared by admixing 88 weight percent of this concentrate and 12 weight percent of dichlorodifluoromethane (40%)–dichlorotetrafluoroethane (60%) propellant. The composition was charged into an aerosol container provided with a foam-dispensing head. The pressure exhibited by the composition in the container was 25 p.s.i.g. at 70° F. When dispensed, the composition produced a foam of limited stability.

EXAMPLE 3

Body Cologne

| Composition: | Weight percent |
| --- | --- |
| "Polawax" (a stearyl alcohol-ethylene oxide condensation product) | 1.0 |
| Anhydrous ethyl alcohol | 43.0 |
| Glycerol | 54.0 |
| Perfume | 2.0 |

The "Polawax" is dissolved with agitation in the anhydrous ethyl elcohol at temperature of 120° F. The solution is cooled to 100° F., and the rest of the ingredients are added to form a liquid concentrate. The final composition is prepared by admixing 92 weight percent of this concentrate and 8 weight percent of dichlorodifluoromethane propellant. The composition is charged into an aerosol container provided with a foam-dispensing head. The pressure exhibited by the composition in the container is about 30 p.s.i.g. at 70° F. When dispensed, the composition produces a foam of limited stability.

EXAMPLE 4

*Paint Remover*

| Composition: | Weight percent |
|---|---|
| "Polawax" | 2.0 |
| Methyl ethyl ketone | 33.0 |
| Acetone | 23.0 |
| Glycerol | 38.0 |
| Polyvinyl pyrrolidone | 4.0 |

The "Polawax" was dissolved with agitation in the methyl ethyl ketone and acetone at temperature of 100° F. The polyvinylpyrrolidone was then added with stirring. The glycerol was slowly added with continued stirring, thereby forming a liquid concentrate. The final composition was prepared by admixing 90 weight percent of this concentrate and 10 weight percent of dichlorodifluoromethane propellant. The composition was charged into an aerosol container provided with a foam-dispensing head. The pressure exhibited by the composition in the container was 15–20 p.s.i.g. at 70° F. When dispensed, the composition produced a foam of limited stability.

After standing for weeks, compositions produced in accordance with the above examples remain clear and homogeneous.

Although the present invention has been described in detail and exemplified by a number of examples, it will be apparent that many changes may be made therein within the principles of the invention.

I claim:

1. An aerosol container provided with a foam-dispensing head and containing a homogeneous liquid composition for use in forming a foam, which foam does not become completely liquefied when exposed to the atmosphere for at least about 15 minutes but, when disturbed, reverts quickly to a liquid, consisting essentially of, by weight, (1) 26 to 64% of a member of the group consisting of saturated aliphatic monohydric alcohols containing 1 to 3 carbon atoms and dialkyl ketones in which the alkyl groups contain 1 to 3 carbon atoms, (2) 28 to 64% of a member of the group consisting of glycerol, monoalkylene glycols in which the alkylene group contains 2 to 4 carbon atoms and polyalkylene glycols in which the alkylene groups contain 2 to 4 carbon atoms, (3) 0.5 to 5% of an organic non-ionic surface active agent, and (4) 2 to 30% of a propellant of the group consisting of liquefied normally gaseous saturated aliphatic hydrocarbons and halogenated saturated aliphatic hydrocarbons, the surface active agent being soluble in one of (1) and (2) but not in both and the propellant being soluble in one of (1) and (2) and having a solubility not exceeding 15% by weight in the other solvent, said composition being confined in the container under the vapor pressure of the propellant.

2. An aerosol container provided with a foam-dispensing head and containing a homogeneous liquid composition for use in forming a foam, which foam does not become completely liquefied when exposed to the atmosphere for at least 15 minutes but, when disturbed, reverts quickly to a liquid, consisting essentially of, by weight, (1) 26 to 64% of a saturated aliphatic monohydric alcohol containing 1 to 3 carbon atoms, (2) 28 to 64% of a member of the group consisting of glycerol, monoalkylene glycols in which the alkylene group contains 2 to 4 carbon atoms and polyalkylene glycols in which the alkylene groups contain 2 to 4 carbon atoms, (3) 0.5 to 5% of an organic non-ionic surface active agent, and (4) 2 to 30% of a propellant of the group consisting of liquefied normally gaseous saturated aliphatic hydrocarbons and halogenated saturated aliphatic hydrocarbons, the surface active agent being soluble in one of (1) and (2) but not in both and the propellant being soluble in one of (1) and (2) and having a solubility not exceeding 15% by weight in the other solvent, said composition being confined in the container under the vapor pressure of the propellant.

3. An aerosol container provided with a foam-dispensing head and containing a homogeneous liquid composition for use in forming a foam, which foam does not become completely liquefied when exposed to the atmosphere for at least 15 minutes but, when disturbed, reverts quickly to a liquid, consisting essentially of, by weight, (1) 26 to 64% of a dialkyl ketone in which the alkyl groups contain 1 to 3 carbon atoms, (2) 28 to 64% of a member of the group consisting of glycerol, monoalkylene glycols in which the alkylene group contains 2 to 4 carbon atoms and polyalkylene glycols in which the alkylene groups contain 2 to 4 carbon atoms, (3) 0.5 to 5% of an organic non-ionic surface active agent, and (4) 2 to 30% of a propellant of the group consisting of liquefied normally gaseous saturated aliphatic hydrocarbons and halogenated saturated aliphatic hydrocarbons, the surface active agent being soluble in one of (1) and (2) but not in both and the propellant being soluble in one of (1) and (2) and having a solubility not exceeding 15% by weight in the other solvent, said composition being confined in the container under the vapor pressure of the propellant.

4. An aerosol container provided with a foam-dispensing head and containing a homogeneous liquid composition for use in forming a foam, which foam does not become completely liquefied when exposed to the atmosphere for at least 15 minutes but, when disturbed, reverts quickly to a liquid, consisting essentially of, by weight, (1) 26 to 64% of ethyl alcohol, (2) 28 to 64% of a member of the group consisting of glycerol, monoalkylene glycols in which the alkylene group contains 2 to 4 carbon atoms, and polyalkylene glycols in which the alkylene groups contain 2 to 4 carbon atoms, (3) 0.5 to 5% of an organic non-ionic surface active agent, and (4) 2 to 30% of a propellant of the group consisting of liquefied normally gaseous saturated aliphatic hydrocarbons and halogenated saturated aliphatic hydrocarbons, the surface active agent being soluble in one of (1) and (2) but not in both and the propellant being soluble in one of (1) and (2) and having a solubility not exceeding 15% by weight in the other solvent, said composition being confined in the container under the vapor pressure of the propellant.

5. An aerosol container provided with a foam-dispensing head and containing a homogeneous liquid composition for use in forming a foam, which foam does not become completely liquefied when exposed to the atmosphere for at least about 15 minutes but, when disturbed, reverts quickly to a liquid, consisting essentially of, by weight, (1) 26 to 64% of ethyl alcohol, (2) 28 to 64% of a member of the group consisting of glycerol, monoalkylene glycols in which the alkylene group contains 2 to 4 carbon atoms and polyalkylene glycols, in which the alkylene groups contain 2 to 4 carbon atoms, (3) 0.5 to 5% of an organic non-ionic surface active agent, and (4) 3 to 30% of a chlorofluorinated saturated aliphatic hydrocarbon propellant, the surface active agent being soluble in one of (1) and (2) but not in both and the propellant being soluble in one of (1) and (2) and having a solubility not exceeding 15% by weight in the other solvent, said composition being confined in the container under the vapor pressure of the propellant.

6. An aerosol container provided with a foam-dispensing head and containing a homogeneous liquid composition for use in forming a foam, which foam does not become completely liquefied when exposed to the atmosphere for at least about 15 minutes but, when disturbed, reverts quickly to a liquid, consisting essentially of, by weight, (1) 26 to 64% of ethyl alcohol, (2) 28 to 64% of a member of the group consisting of glycerol, monoalkylene glycols in which the alkylene group contains 2 to 4 carbon atoms and polyalkylene glycols in which the alkylene groups contain 2 to 4 carbon atoms, (3) 0.5 to 5% of a surface active agent comprising a polyoxyethylated fatty alcohol, and (4) 3 to 30% of a chlorofluorinated saturated aliphatic hydrocarbon propellant, the surface active agent being soluble in one of (1) and (2) but not in both and the propellant being soluble in one of (1) and (2) and having a solubility not exceeding 15% by weight in the other solvent, said composition being confined in the container under the vapor pressure of the propellant.

References Cited in the file of this patent

UNITED STATES PATENTS 2,719,129     Richardson _____ Sept. 27, 1955

OTHER REFERENCES

Pickthall: "Glycerin in Aerosols," Manufacturing Chemist, (December 1957) (pages 541–544).